US011769297B2

(12) United States Patent
Mizerski et al.

(10) Patent No.: US 11,769,297 B2
(45) Date of Patent: Sep. 26, 2023

(54) SIMULATION OF RIGID BODIES

(71) Applicant: Roblox Corporation, San Mateo, CA (US)

(72) Inventors: Maciej Mizerski, Kelowna (CA); Aki Matias Nyrhinen, Sunnyvale, CA (US)

(73) Assignee: Roblox Corporation, San Mateo, CA (US)

( * ) Notice: Subject to any disclaimer, the term of this patent is extended or adjusted under 35 U.S.C. 154(b) by 70 days.

(21) Appl. No.: 17/494,355

(22) Filed: Oct. 5, 2021

(65) Prior Publication Data
US 2022/0207826 A1  Jun. 30, 2022

Related U.S. Application Data

(60) Provisional application No. 63/132,997, filed on Dec. 31, 2020.

(51) Int. Cl.
G06T 17/10 (2006.01)
G06T 19/00 (2011.01)

(52) U.S. Cl.
CPC .......... G06T 17/10 (2013.01); G06T 19/003 (2013.01); G06T 2219/2004 (2013.01)

(58) Field of Classification Search
CPC ....... G06T 17/10; G06T 19/00; G06T 19/003; G06T 2219/2004; G06T 13/00–80; A63F 13/35; A63F 13/52; A63F 13/57; A63F 2300/6607
See application file for complete search history.

(56) References Cited

U.S. PATENT DOCUMENTS

2010/0134501 A1 * 6/2010 Lowe ............... G06T 13/40 345/473
2018/0197318 A1 * 7/2018 Powell .............. G06T 13/20

OTHER PUBLICATIONS

Blender_Video (NPL Video Titled "Blender Add-on Overview: Rigid Bodys Generator (free)—Let's break some bones.", available for viewing at: https://www.youtube.com/watch?v=0haYapQ7l_U; published Mar. 9, 2020; select screenshots included. (Year: 2020).*
"Improving Simulation and Performance with an Advanced Physics Solver", Retrieved from Internet: https://blog.roblox.com/2020/08/improving-simulation-performance-advanced-physics-solver/, Aug. 5, 2020, 9 pages.

(Continued)

Primary Examiner — Daniel F Hajnik
(74) Attorney, Agent, or Firm — IP Spring

(57) ABSTRACT

Implementations relate to a computer-implemented method to display a rigid body object within a virtual environment. Some implementations include receiving a model representation of the rigid body object, wherein the model representation includes a plurality of constraints for the rigid body object; splitting the rigid body object into two or more splinters based on the model representation, obtaining a modified representation of the rigid body object based on a modified rigid body object formed by connecting each of the two or more splinters to one or more other splinters by one or more rigid joints, determining an input state of the rigid body object in the virtual environment, solving a set of equations based on the input state and the modified representation of the rigid body object to determine an updated state of the rigid body object.

20 Claims, 11 Drawing Sheets

(56) References Cited

OTHER PUBLICATIONS

Baraff, "Analytical Methods for Dynamic Simulation of Non-penetrating Rigid Bodies", SIGGRAPH '89, Computer Graphics, vol. 23, No. 3, 1989, pp. 223-232.

Baraff, "Fast Contact Force Computation for Nonpenetrating Rigid Bodies", Proceedings of the 21st annual conference on Computer graphics and interactive techniques, 1994, 12 pages.

Baraff, "Linear-Time Dynamics using Lagrange Multipliers", Proceedings of the 23rd annual conference on Computer graphics and interactive techniques, 1996, 10 pages.

Catto, et al., "Iterative Dynamics with Temporal Coherence", Game developer conference. vol. 2. No. 5, 2005, 24 pages.

Cline, et al., "Post-Stabilization for Rigid Body Simulation with Contact and Constraints", 2003 IEEE International Conference on Robotics and Automation (Cat. No. 03CH37422). vol. 3. IEEE, 2003, 8 pages.

Erleben, et al., "Physics-Based Animation", Retrieved from Internet: https://iphys.wordpress.com/2020/01/12/free-textbook-physics-based-animation/, 2005, 4 pages.

Stewart, "An Implicit Time-Stepping Scheme for Rigid Body Dynamics with Coulomb Friction", Proceedings 2000 ICRA. Millennium Conference. IEEE International Conference on Robotics and Automation. Symposia Proceedings (Cat. No. 00CH37065). vol. 1. IEEE, 2000, 8 pages.

Guendelman, et al., "Nonconvex Rigid Bodies with Stacking", ACM transactions on graphics (TOG) 22.3, 2003, pp. 871-878.

Mirtich, et al., "Impulse-based Simulation of Rigid Bodies", Proceedings of the 1995 symposium on Interactive 3D graphics, 1995, 9 pages.

Mizerski, "Improving an Interactive Physics Solver Using a Direct Method", https://www.gdcvault.com/play/1026684/Math-In-Game-Development-Summit, Mar. 2020, 78 pages.

Mizerski, "Motion of Spinning Bodies (Old from Oct)", https://mizerski.medium.com/motion-of-spinning-bodies-f9e85b5c585d, Oct. 2, 2020, 30 pages.

Souto, "Video Game Physics Tutorial—Part 1: an Introduction to Rigid Body Dynamics", Retrieved from Internet: https://www.toptal.com/game/video-game-physics-part-i-an-introduction-to-rigid-body-dynamics.

* cited by examiner

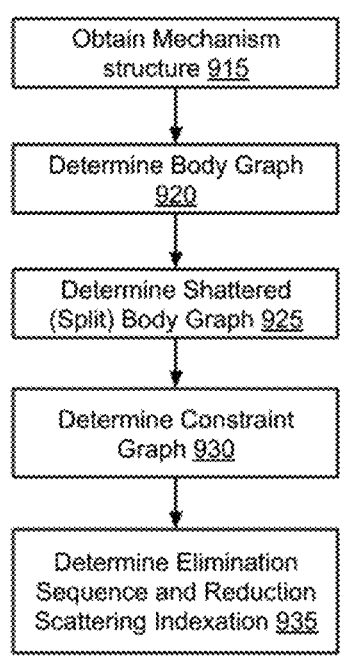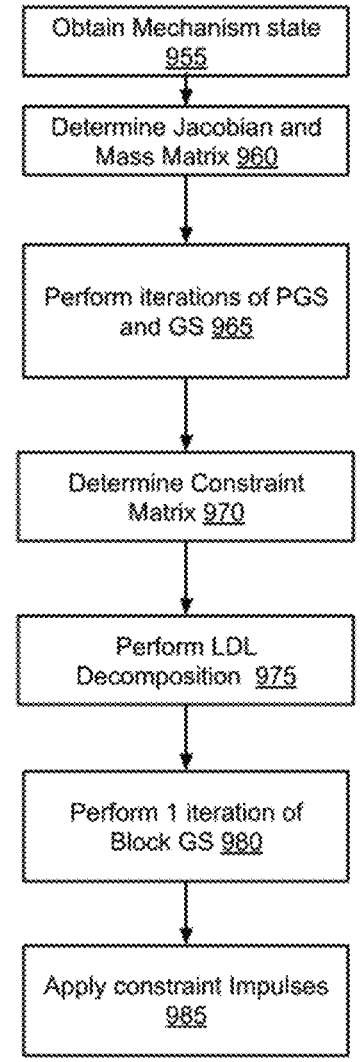
FIG. 9A
FIG. 9B

SIMULATION OF RIGID BODIES

CROSS-REFERENCE TO RELATED PATENT APPLICATIONS

The present application is a non-provisional of and claims the benefit of priority to U.S. Provisional Application Ser. No. 63/132,997, entitled "SIMULATION OF RIGID BODIES" and filed on Dec. 31, 2020, the entire contents of which are hereby incorporated by reference herein.

TECHNICAL FIELD

Implementations relate generally to computer-based gaming, and more particularly, to methods, systems, and computer readable media to simulate motion of rigid body objects within a virtual environment.

BACKGROUND

Some online platforms (e.g., gaming platforms, media exchange platforms, etc.), allow users to connect with each other, interact with each other (e.g., within a game), create games, and share information with each other via the Internet. Users of online gaming platforms may participate in multiplayer gaming environments or virtual environments (e.g., three-dimensional environments), design custom gaming environments, design characters, design mechanisms, exchange virtual items/objects with other users, communicate with other users using audio or text messaging, and so forth. Users may interact with objects within the virtual environment, and simulation of the objects may be performed within the virtual environment.

Simulation of objects within the virtual environment may utilize a physics engine and/or physics solver to determine a current state of one or more objects, which may then be displayed on one or more user device(s).

Some implementations were conceived in light of the above.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes receiving a model representation of the rigid body object. The receiving also includes splitting the rigid body object into two or more splinters based on the model representation, where each of the two or more splinters is associated with a corresponding subset of constraints; obtaining a modified representation of the rigid body object based on a modified rigid body object formed by connecting each of the two or more splinters to one or more other splinters by one or more rigid joints; determining an input state of the rigid body object in the virtual environment, where the input state may include one or more of a position or an orientation associated with the rigid body object; solving a set of equations based on the input state and the modified representation of the rigid body object to determine an updated state of the rigid body object, where the updated state includes at least one of: an updated position or an updated orientation of the rigid body object; and causing the rigid body object in the updated state to be displayed within the virtual environment.

Other embodiments of this aspect include corresponding computer systems, apparatus, and computer programs recorded on one or more computer storage devices, each configured to perform the actions of the methods.

Implementations may include one or more of the following features. The method where the determining, solving, and causing to be displayed are performed once per update period, with the updated state at each update period being the input state at a next update period. Solving the set of equations based on the modified representation may include iteratively solving the set of equations associated with the modified rigid body object using a LDL-PGS solver.

The computer-implemented method may include: prior to the splitting the rigid body object into two or more splinters: identifying a number of constraints of the plurality of constraints; comparing a total number of constraint dimensions on the rigid body object against a predetermined threshold; and responsive to determination that the total number of constraint dimensions meets the predetermined threshold, splitting the rigid body object into two or more splinters. The predetermined threshold is about 20.

Solving a set of equations based on the modified representation may include solving a first portion of the set of equations that includes equality constraints using a block gauss-seidel method and solving a second portion of the set of equations that includes inequality or friction constraints using a projected gauss-seidel method.

Receiving the model representation may include receiving a model of a rigid body object that describes the rigid body object and one or more constraint functions that characterize connectivity between the rigid body object and one or more constraints of the plurality of constraints. Each node of the body graph represents a particular splinter, and each edge of the body graph represent corresponding constraints of the plurality of constraints. Each node of the constraint graph represents a particular constraint, and each edge of the constraint graph represents splinters common between corresponding constraints.

Solving the set of equations based on the modified representation may include: determining one or more forces acting on the modified rigid body object; performing a plurality of iterations of a projected gauss-seidel (PGS) solver; performing an LDL decomposition of a constraint matrix associated with the modified rigid body object; and performing a block gauss-seidel operation to apply LDL corrections to the constraint impulses computed by the PGS solver to determine the updated state of the modified rigid body object.

Performing the LDL decomposition of the constraint matrix utilizes gaussian elimination, and where an order of elimination of nodes in the Gaussian elimination is determined by applying a minimum edge creation algorithm to a constraint graph associated with the constraint matrix to generate an ordered sequence of nodes. The computer-implemented method may include performing memory allocation based on the order of elimination of nodes. Determining an updated state of the rigid body object may include determining two or more of an updated position, an updated orientation, an updated linear velocity, or an updated angular velocity associated with the rigid body object. Implementations of the described techniques may include hardware, a method or process, or computer software on a computer-accessible medium.

One general aspect includes a non-transitory computer-readable medium may include instructions that. The non-transitory computer-readable medium also includes receiving a model representation of a rigid body object, where the model representation includes a plurality of constraints for the rigid body object; splitting the rigid body object into two or more splinters based on the model representation, where each of the two or more splinters is associated with a corresponding subset of constraints; obtaining a modified representation of the rigid body object based on a modified rigid body object formed by connecting each of the two or more splinters to one or more other splinters by one or more rigid joints; determining an input state of the rigid body object in a virtual environment, where the input state may include one or more of a position or an orientation associated with the rigid body object; solving a set of equations based on the input state and the modified representation of the rigid body object to determine an updated state of the rigid body object, where the updated state includes at least one of: an updated position, an updated orientation, an updated linear velocity, and an updated angular velocity of the rigid body object; and causing the rigid body object in the updated state to be displayed within the virtual environment.

Other embodiments of this aspect include corresponding computer systems, apparatus, and computer programs recorded on one or more computer storage devices, each configured to perform the actions of the methods.

Implementations may include one or more of the following features. The non-transitory computer-readable medium where solving a set of equations based on the modified representation may include solving a first portion of the set of equations that includes equality constraints using a block gauss-seidel method and solving a second portion of the set of equations that includes inequality or friction constraints using a projected gauss-seidel method.

Determining an updated state of the rigid body object may include determining two or more of an updated position, an updated orientation, an updated linear velocity, and an updated angular velocity associated with the rigid body object. Implementations of the described techniques may include hardware, a method or process, or computer software on a computer-accessible medium.

In some implementations, a system includes a memory with instructions stored thereon; and a processing device, coupled to the memory, the processing device configured to access the memory and execute the instructions, where the instructions cause the processing device to perform operations including: receiving a model representation of a rigid body object, where the model representation includes a plurality of constraints for the rigid body object; splitting the rigid body object into two or more splinters based on the model representation, where each of the two or more splinters is associated with a corresponding subset of constraints; obtaining a modified representation of the rigid body object based on a modified rigid body object formed by connecting each of the two or more splinters to one or more other splinters by one or more rigid joints; determining an input state of the rigid body object in a virtual environment, where the input state may include one or more of a position or an orientation associated with the rigid body object; solving a set of equations based on the input state and the modified representation of the rigid body object to determine an updated state of the rigid body object, where the updated state includes at least one of: an updated position, an updated orientation, an updated linear velocity, and an updated angular velocity of the rigid body object; and causing the rigid body object in the updated state to be displayed within the virtual environment. Other embodiments of this aspect include corresponding computer systems, apparatus, and computer programs recorded on one or more computer storage devices, each configured to perform the actions of the methods.

Implementations may include one or more of the following features. The system where solving the set of equations based on the modified representation may include: determining one or more forces acting on the modified rigid body object; performing a plurality of iterations of a projected gauss-seidel (PGS) solver; performing an LDL decomposition of a constraint matrix associated with the modified rigid body object; and performing a block gauss-seidel operation to apply LDL corrections to constraint impulses computed by the PGS solver to determine the updated state of the modified rigid body object.

Performing the LDL decomposition of a constraint matrix utilizes gaussian elimination, and where an order of elimination of nodes in the gaussian elimination is determined by applying a minimum edge creation algorithm to a constraint graph associated with the constraint matrix to generate an ordered sequence of nodes. The determining, solving, and causing to be displayed are performed once per physics update period, with the updated state at each physics update period being the input state at a next physics update period. In some implementations, the determining, solving, and causing to be displayed are performed once per frame, with the updated state at each frame being the input state at a next frame. Implementations of the described techniques may include hardware, a method or process, or computer software on a computer-accessible medium.

BRIEF DESCRIPTION OF DRAWINGS

FIG. 9A depicts an example symbolic phase for the simulation of rigid body objects and mechanisms, in accordance with some implementations.

FIG. 9B depicts an example numeric phase for the simulation of rigid body objects and mechanisms, in accordance with some implementations.

DETAILED DESCRIPTION

Figure 1:
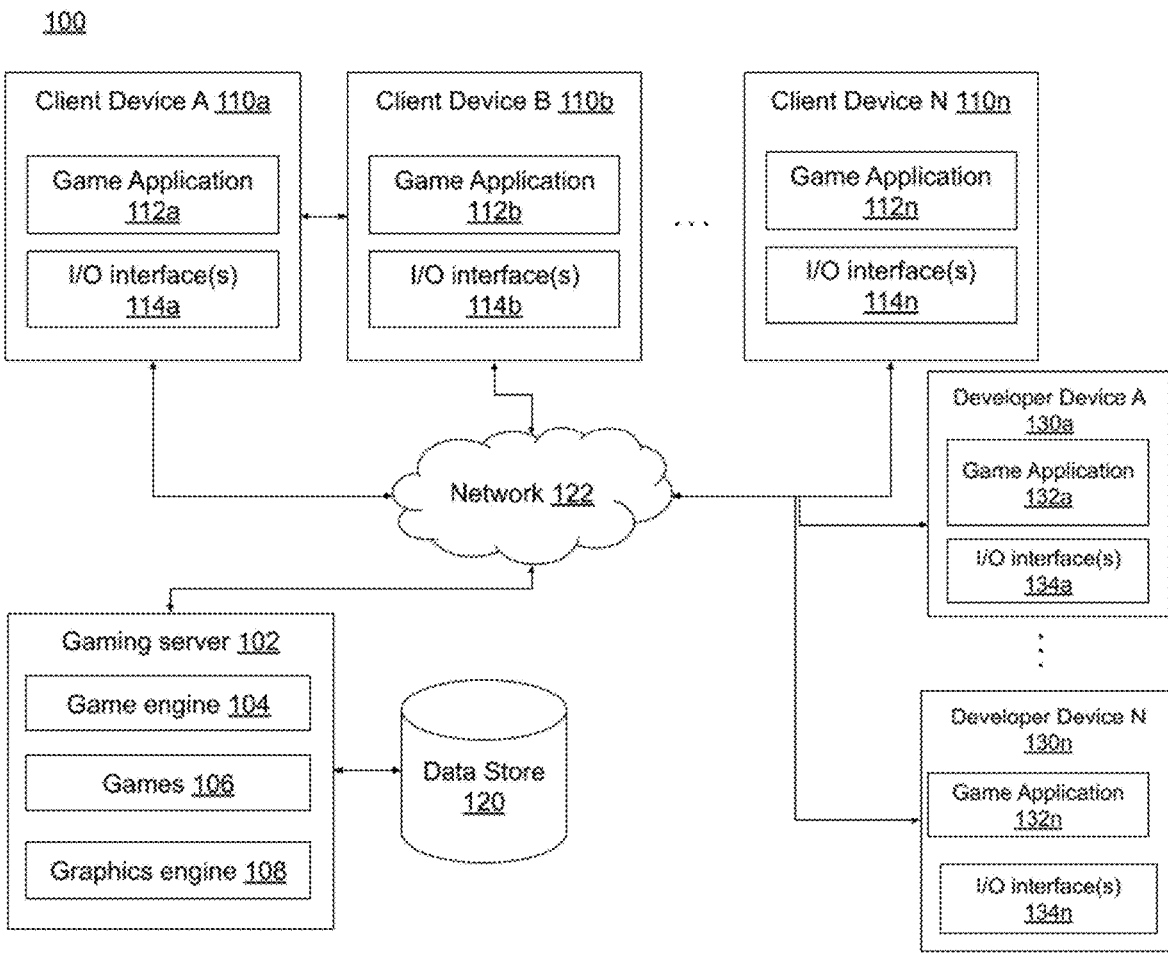
FIG. 1 is a diagram of an example system architecture for simulation of rigid body objects, in accordance with some implementations.

In the following detailed description, reference is made to the accompanying drawings, which form a part hereof In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

Online gaming platforms (also referred to as "user-generated content platforms" or "user-generated content systems") offer a variety of ways for users to interact with one another. For example, users of an online gaming platform may work together towards a common goal, share various virtual gaming items, send electronic messages to one another, and so forth. Users of an online gaming platform may join games as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

The online gaming platform may also support use of virtual objects that mimic physical objects (rigid body objects) within a virtual environment. For example, the online gaming platform may enable users to design and introduce various categories of virtual objects, e.g., vehicles, weapons and weapon accessories, toys, structures, etc. These objects may be viewed by one or more users within a virtual environment supported by the online gaming platform. For example, motion of such objects within the virtual environment may be displayed on user devices.

Simulation may be performed to determine a current state of an object based on properties of the object, a previous state, and various force(s) acting on the object. Simulation may be performed using a physics engine (physics platform), which is utilized to apply various physical laws to objects within a virtual environment.

A physics engine may include a physics solver that is utilized to determine an updated state of objects within the virtual environment. An output of a physics engine and/or physics solver may be utilized to display an updated state of one or more objects within the virtual environment. Enabling real-time updates of motion of objects within a virtual environment may be enabled by a computationally efficient physics solver that can accurately determine an updated state within time limits imposed for such computation(s). Additionally, the physics solver is implemented to account for various types of possible objects designed by users and still not be susceptible to instabilities, e.g., wherein underlying algorithms within the physics solver do not converge due to a particular type of rigid body object designed and provided by a user. A physics engine and/or physics solver can improve computational performance across devices in the online gaming platform while also providing a better user experience, e.g., by displays where objects in the virtual environment move smoothly without jitters, etc.

An online gaming platform may also allow users (developers) of the platform to create new objects and/or mechanisms. For example, users of the online gaming platform may be enabled to create, design, and/or customize new objects such as vehicles, tools, toys, and make them available to other users.

The online gaming platform may provide tools to support simulation of objects and mechanisms within a virtual environment. In some implementations, a physics engine and/or physics solver may be utilized for the simulation of objects.

Some objects and/or parameters within a virtual environment may be such that the complexity of simulating the objects and environment may be computationally expensive to enable the simulation to meet time requirements for real-time simulation and rendering of the object. For example, an updated state of objects may have to be determined within a time period that meets requirements for a particular frame refresh rate of a display device where the updated state of objects is displayed to a user. Failure to meet the time requirement can lead to jittery updates, leading to a poor visual experience for the user.

An objective of a game platform owner or administrator is superior user experience for its users. A technical problem for online gaming platform operators is accurate, timely, and computationally efficient determination of object states within a virtual environment.

Some online gaming environments may restrict the types of objects that are permitted to be utilized on the online gaming platform, and/or may utilize physics engines and physics solvers that are tailored to the particular types of objects. It may be beneficial for online gaming platforms to permit a broader variety of objects and users may be encouraged to design and introduce complex mechanisms that may include multiple rigid body objects that are associated with multiple constraints. Physics solvers that provide satisfactory simulation results for some objects can fail to do so, for other complex objects and/or mechanisms. In some cases, conventional physics solvers may encounter instabilities, causing the objects to explode, disappear, or exhibit other behaviors that are unnatural or impossible under the rules defined for the virtual environment, e.g., gravity or other factors within the virtual environment etc.

The present disclosure addresses the above-described drawbacks by utilization of a physics solver that takes object characteristics into account during determination of updated object states. In addition, matrix and graph techniques are applied to provide a physics solver that is robust to a variety of objects and mechanisms and is computationally efficient. In particular, the physics solver as described herein utilizes matrices and graphs to represent systems of equations associated with motion of the objects and constructs sparse matrices that exhibit particular properties that enable efficient computation of updated object states. In some cases, where matrices and/or sub-matrices associated with the system of equations of objects are large and dense, techniques are described to enable their conversion to sparse variants to improve computational efficiency.

Implementations are described herein to simulate motion of rigid body objects on an online gaming platform. Further, the implementations may offer performance that is linear in scale to a number of constraints that are associated with the rigid body virtual objects.

In some implementations, memory allocation is performed based on a structure of the matrices associated with the system(s) of equations that govern simulated objects, which can further improve runtime performance.

FIG. 1 is a diagram of an example system architecture for simulation of rigid body objects, in accordance with some implementations. FIG. 1 and the other figures use like reference numerals to identify like elements. A letter after a reference numeral, such as "110," indicates that the text refers specifically to the element having that particular reference numeral. A reference numeral in the text without a following letter, such as "110," refers to any or all of the data elements in the figures bearing that reference numeral (e.g. "110" in the text refers to reference numerals "110a," "110b," and/or "110n" in the figures).

The system architecture 100 (also referred to as "system" herein) includes online gaming server 102, data store 120, client devices 110a, 110b, and 110n (generally referred to as "client device(s) 110" herein), and developer devices 130a and 130n (generally referred to as "developer device(s) 130" herein). Gaming server 102, data store 120, client devices 110, and developer devices 130 are coupled via network 122. In some implementations, client devices(s) 110 and developer device(s) 130 may refer to the same or same type of device.

Online gaming server 102 can include, among other things, a game engine 104, one or more games 106, and graphics engine 108. In some implementations, the graphics engine 108 may be a system, application, or module that permits the online gaming server 102 to provide graphics and animation capability. In some implementations, the graphics engine 108 may perform one or more of the operations described below in connection with the flowchart shown in FIG. 6. A client device 110 can include a game application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a game application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the online gaming server 102 can include a server having one or more computing devices (e.g., a cloud computing system, a rackmount server, a server computer, cluster of physical servers, etc.). In some implementations, the online gaming server 102 may be an independent system, may include multiple servers, or be part of another system or server.

In some implementations, the online gaming server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming server 102 and to provide a user with access to online gaming server 102. The online gaming server 102 may also include a web site (e.g., a web page) or application back-end software that may be used to provide a user with access to content provided by online gaming server 102. For example, users may access online gaming server 102 using the game application 112 on client devices 110.

In some implementations, gameplay session data are generated via online gaming server 102, game application 112, and/or game application 132, and are stored in data store 120. With permission from game players, gameplay session data may include associated metadata, e.g., game identifier(s); device data associated with the players; demographic information of the player(s); gameplay session identifier(s); chat transcripts; session start time, session end time, and session duration for each player; relative locations of participant avatar(s) within a virtual game environment; in-game purchase(s) by one or more player(s); accessories utilized by game players; etc.

In some implementations, online gaming server 102 may be a type of social network providing connections between users or a type of user-generated content system that allows users (e.g., end-users or consumers) to communicate with other users on the online gaming server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within games 106. The data store 120 may be utilized to store chat transcripts (text, audio, images, etc.) exchanged between players.

In some implementations, the chat transcripts are generated via game application 112 and/or game application 132 or and are stored in data store 120. The chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual game environment, accessories utilized by game participants, etc. In some implementations, the chat transcripts may include multilingual content, and messages in different languages from different gameplay sessions of a game may be stored in data store 120.

In some implementations, chat transcripts may be stored in the form of conversations between participants based on the timestamps. In some implementations, the chat transcripts may be stored based on the originator of the message(s).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming server 102 may be a virtual gaming server. For example, the gaming server may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using client devices (e.g., 110) within a game (e.g., 106) or the presentation of the interaction on a display or other output device (e.g., 114) of a client device 110.

In some implementations, a game 106 can include an electronic file that can be executed or loaded using software, firmware or hardware configured to present the game content (e.g., digital media item) to an entity. In some implementations, a game application 112 may be executed and a game 106 rendered in connection with a game engine 104. In some implementations, a game 106 may have a common set of rules or common goal, and the environment of a game 106 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game 106 may be collectively referred to as a "world" or "gaming world" or "virtual world" or "universe" herein. An example of a world may be a 3D world of a game 106. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming server 102 can host one or more games 106 and can permit users to interact with the games 106 using a game application 112 of client devices 110. Users of the online gaming server 102 may play, create, interact with, or build games 106, communicate with other users, and/or create and build objects (e.g., also referred to as "item(s)" or "game objects" or "virtual game item(s)" herein) of games 106.

For example, in generating user-generated virtual items, users may create characters, decoration for the characters, one or more virtual environments for an interactive game, or build structures used in a game 106, among others. In some implementations, users may buy, sell, or trade game virtual game objects, such as in-platform currency (e.g., virtual currency), with other users of the online gaming server 102. In some implementations, online gaming server 102 may transmit game content to game applications (e.g., 112). In some implementations, game content (also referred to as "content" herein) may refer to any data or software instructions (e.g., game objects, game, user information, video, images, commands, media item, etc.) associated with online gaming server 102 or game applications. In some implementations, game objects (e.g., also referred to as "item(s)" or "objects" or "virtual objects" or "virtual game item(s)" herein) may refer to objects that are used, created, shared or otherwise depicted in game applications 106 of the online gaming server 102 or game applications 112 of the client devices 110. For example, game objects may include a part, model, character, accessories, tools, weapons, clothing, buildings, vehicles, currency, flora, fauna, components of the aforementioned (e.g., windows of a building), and so forth.

It may be noted that the online gaming server 102 hosting games 106, is provided for purposes of illustration. In some implementations, online gaming server 102 may host one or more media items that can include communication messages from one user to one or more other users. With user permission and express user consent, the online gaming server 102 may analyze chat transcripts data to improve the game platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 106 may be associated with a particular user or a particular group of users (e.g., a private game), or made widely available to users with access to the online gaming server 102 (e.g., a public game). In some implementations, where online gaming server 102 associates one or more games 106 with a specific user or group of users, online gaming server 102 may associate the specific user(s) with a game 106 using user account information (e.g., a user account identifier such as username and password).

In some implementations, online gaming server 102 or client devices 110 may include a game engine 104 or game application 112. In some implementations, game engine 104 may be used for the development or execution of games 106. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.) In some implementations, game applications 112 of client devices 110/116, respectively, may work independently, in collaboration with game engine 104 of online gaming server 102, or a combination of both.

In some implementations, both the online gaming server 102 and client devices 110 may execute a game engine (104 and 112, respectively). The online gaming server 102 using game engine 104 may perform some or all the game engine functions (e.g., generate physics commands, rendering commands, etc.), or offload some or all the game engine functions to game engine 104 of client device 110. In some implementations, each game 106 may have a different ratio between the game engine functions that are performed on the online gaming server 102 and the game engine functions that are performed on the client devices 110. For example, the game engine 104 of the online gaming server 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming server 102 and client device 110 may be changed (e.g., dynamically) based on gameplay conditions. For example, if the number of users participating in gameplay of a particular game 106 exceeds a threshold number, the online gaming server 102 may perform one or more game engine functions that were previously performed by the client devices 110.

For example, users may be playing a game 106 on client devices 110, and may send control instructions (e.g., user inputs, such as right, left, up, down, user election, or character position and velocity information, etc.) to the online gaming server 102. Subsequent to receiving control instructions from the client devices 110, the online gaming server 102 may send gameplay instructions (e.g., position and velocity information of the characters participating in the group gameplay or commands, such as rendering commands, collision commands, etc.) to the client devices 110 based on control instructions. For instance, the online gaming server 102 may perform one or more logical operations (e.g., using game engine 104) on the control instructions to generate gameplay instruction(s) for the client devices 110. In other instances, online gaming server 102 may pass one or more or the control instructions from one client device 110 to other client devices (e.g., from client device 110a to client device 110b) participating in the game 106. The client devices 110 may use the gameplay instructions and render the gameplay for presentation on the displays of client devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming server 102. In other implementations, the control instructions may be sent from a client device 110 to another client device (e.g., from client device 110b to client device 110n), where the other client device generates gameplay instructions using the local game engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that enable a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, characters (or game objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g. shoulder and hip ratio); head size; etc.

One or more characters (also referred to as an "avatar" or "model" herein) may be associated with a user where the user may control the character to facilitate a user's interaction with the game 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g. shirts, pants, etc. the online gaming platform may provide users with access to simplified 3D virtual object models that are represented by a mesh of a low polygon count, e.g. between about 20 and about 30 polygons.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online gaming server 102. In some implementations, creating, modifying, or customizing characters, other game objects, games 106, or game environments may be performed by a user using a I/O interface (e.g., developer interface) and with or without scripting (or with or without an application programming interface (API)). It may be noted that for purposes of illustration, characters are described as having a humanoid form. It may further be noted that characters may have any form such as a vehicle, animal, inanimate object, or other creative form.

In some implementations, the online gaming server 102 may store characters created by users in the data store 120. In some implementations, the online gaming server 102 maintains a character catalog and game catalog that may be presented to users. In some implementations, the game catalog includes images of games stored on the online gaming server 102. In addition, a user may select a character (e.g., a character created by the user or other user) from the character catalog to participate in the chosen game. The character catalog includes images of characters stored on the online gaming server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online gaming server 102 at any given moment. It may be noted that the number of client devices 110 is provided as illustration. In some implementations, any number of client devices 110 may be used.

In some implementations, each client device 110 may include an instance of the game application 112, respectively. In one implementation, the game application 112 may permit users to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application may be an online gaming server application for users to build, create, edit, upload content to the online gaming server 102 as well as interact with online gaming server 102 (e.g., play games 106 hosted by online gaming server 102). As such, the game application may be provided to the client device(s) 110 by the online gaming server 102. In another example, the game application may be an application that is downloaded from a server.

In some implementations, each developer device 130 may include an instance of the game application 132, respectively. In one implementation, the game application 132 may permit a developer user(s) to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 130 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application 132 may be an online gaming server application for users to build, create, edit, upload content to the online gaming server 102 as well as interact with online gaming server 102 (e.g., provide and/or play games 106 hosted by online gaming server 102). As such, the game application may be provided to the client device(s) 130 by the online gaming server 102. In another example, the game application 132 may be an application that is downloaded from a server. Game application 132 may be configured to interact with online gaming server 102 and obtain access to user credentials, user currency, etc. for one or more games 106 developed, hosted, or provided by a game developer.

In some implementations, a user may login to online gaming server 102 via the game application. The user may access a user account by providing user account information (e.g., username and password) where the user account is associated with one or more characters available to participate in one or more games 106 of online gaming server 102. In some implementations, with appropriate credentials, a game developer may obtain access to game virtual game objects, such as in-platform currency (e.g., virtual currency), avatars, special powers, accessories, that are owned by or associated with other users.

In general, functions described in one implementation as being performed by the online gaming server 102 can also be performed by the client device(s) 110, or a server, in other implementations if appropriate. In addition, the functionality attributed to a particular component can be performed by different or multiple components operating together. The online gaming server 102 can also be accessed as a service provided to other systems or devices through appropriate application programming interfaces (APIs), and thus is not limited to use in websites.

Figure 2:
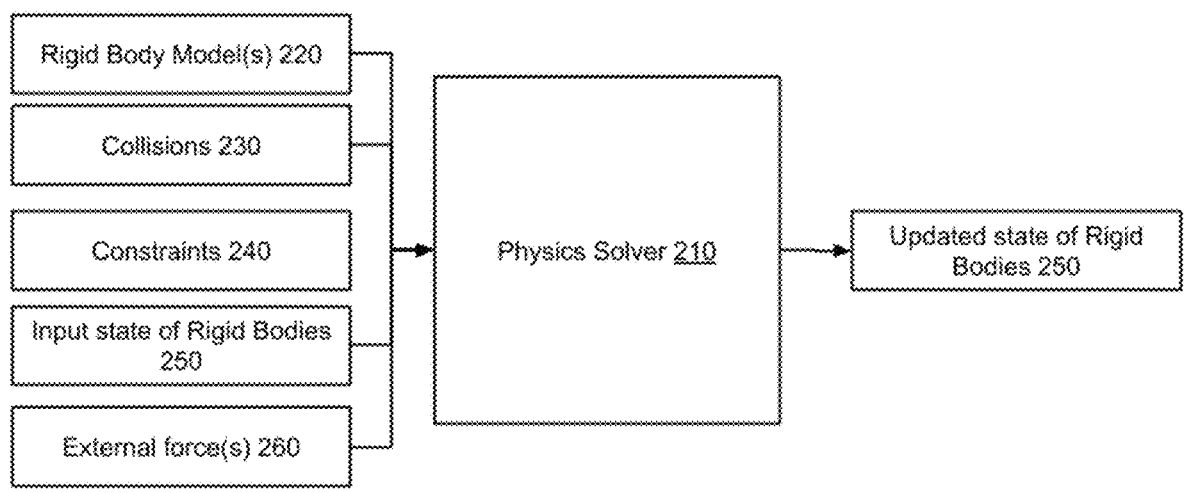
FIG. 2 depicts an example physics solver utilized to simulate motion of rigid body objects, in accordance with some implementations.

FIG. 2 depicts an example physics solver utilized to simulate motion of rigid body objects, in accordance with some implementations. The example physics solver may be utilized by an online gaming platform to simulate motion of constrained rigid body objects (rigid bodies) and mechanisms under the influence of forces in a virtual environment.

A rigid body object is an idealized approximation to a solid body in which deformation is zero or negligible. The distance between points on a rigid body remains constant in time regardless of external forces or moments exerted on it.

The physics solver 210 may be utilized within a physics engine to track and render motion of rigid bodies that may be part of a game in the virtual environment, and to determine the effects of forces such as gravity, collisions between bodies, etc., on a rigid body as the game proceeds from one update period and/or display frame to the next.

In some implementations, a display frame rate may be determined by a processor, e.g., graphics card and refers to a number of frames a system is able to produce in a second, A refresh rate may be based on a rate at which a monitor is able to completely refresh its display. The physics solver may operate at a rate based on an update period that may be different from the display frame rate and the refresh rate. In some implementations, the update period may be determined by an update period that is needed to meet a threshold accuracy and/or stability of mathematical solutions that govern the motion of a rigid body.

The physics solver may be implemented as part of gaming server 102, and may be included within a game engine 104 and/or graphics engine 108. In some implementations, a physics solver is included within a physics engine.

In some implementations, the physics solver may be implemented within one or more client devices 110 or one or more developer devices 130. In some implementations, functionality of a physics solver may be implemented across one or more devices, e.g., between gaming server 102, client device 110, or developer device 130.

As depicted in FIG. 2, the physics solver takes as inputs rigid body object model(s) representation 220, collision data 230 associated with the rigid body objects, constraints 240 imposed on the rigid body objects, an input state 250 of the rigid body objects, and external forces 240 acting on the rigid body objects. In some implementations, one or more of these inputs may not be utilized (e.g., collision data 230) under certain situations (e.g., when objects don't undergo collisions). In some implementations, additional inputs can be provided to physics solver 210. The physics solver generates as output an updated state 250 of the rigid body objects, based on the combined effect on the inputs described earlier.

In some implementations, the rigid body object model representation is a representative model of a corresponding rigid body object and may include information about the rigid body, e.g. shape, dimension, material properties, etc. In some implementations, the rigid body model representation may include additional information that pertain to body physics, e.g. moment of inertia, center of gravity, etc.

Collision data is obtained by collision detection, which may be implemented within a physics engine, e.g., as a module. Collisions between rigid body objects within a virtual environment are detected based on intersections between geometries associated with the rigid body objects.

Collision data such as collision points, normals, penetration depths, etc. are generated by a collision detector.

Constraints are restrictions on the motion of rigid body objects that may be provided by the user as part of the model representation of a rigid body object. Examples of constraints include joints (such as ball joints, hinge joints), etc., and non-penetration constraints.

An input state of the rigid body object to the solver may either be an initial state, e.g., at the start/commencement of a simulation, or a previous rigid body object state from a previously determined state. For example, an input state may be an initial state of a vehicle in a virtual environment, just before the vehicle starts moving.

Inputs to the physics solver also include external force(s) that act on the rigid body object within the virtual environment, e.g., a gravitational force that is acting on a falling rigid body object. The external force(s) may be a default setting within the environment, user defined settings, or a combination. For example, a specified horsepower of a vehicle and an input setting provided by a user (e.g., using a gamestick or remote) may be utilized to derive a force acting on a vehicle based on generated engine power. Similarly, a user may specify a gravity-free setting for a virtual environment, which results in simulation of a gravity-free virtual environment, e.g., gravitational forces would not be applied on the rigid body object.

Based on provided inputs, the physics solver determines an updated state of the rigid body object(s) by solving for the motion of rigid bodies under the influence of various provided inputs.

The updated state of the rigid body object(s) is determined by the physics solver by applying the laws of physics as defined within the virtual environment, such as conservation of energy and momentum, to the rigid body object(s). An exact determination, however, can be prohibitively expensive, real-time simulation of rigid body object motion is performed by the user of approximate techniques. This enables suitable performance, e.g., by completion of simulation within a provided time window, while providing physically realistic results. In an online gaming environment, an objective is to maintain adherence to the basic laws of motion within a reasonable tolerance.

One approximation technique utilized is to discretize the motion of the rigid body object using time-stepping. The equations of motion of constrained and unconstrained rigid body objects can be difficult to integrate directly and accurately. The discretization subdivides the motion into small time increments, wherein the equations are simplified and linearized, thereby enabling an approximate solution. During each time step, the motion of the relevant parts of rigid bodies that are associated with a constraint is linearly approximated. The physics solver is utilized to solve the linearized equations of motion for a time step to obtain an updated state of a rigid body object.

In some implementations, an iterative method may be utilized to solve the linear equations of motion, wherein with each iteration, an approximate solution for an updated state of the rigid body object is obtained, that is brought closer to a true solution. A final accuracy of a solution may be based on a number of iterations performed by the physics solver.

Figure 3:
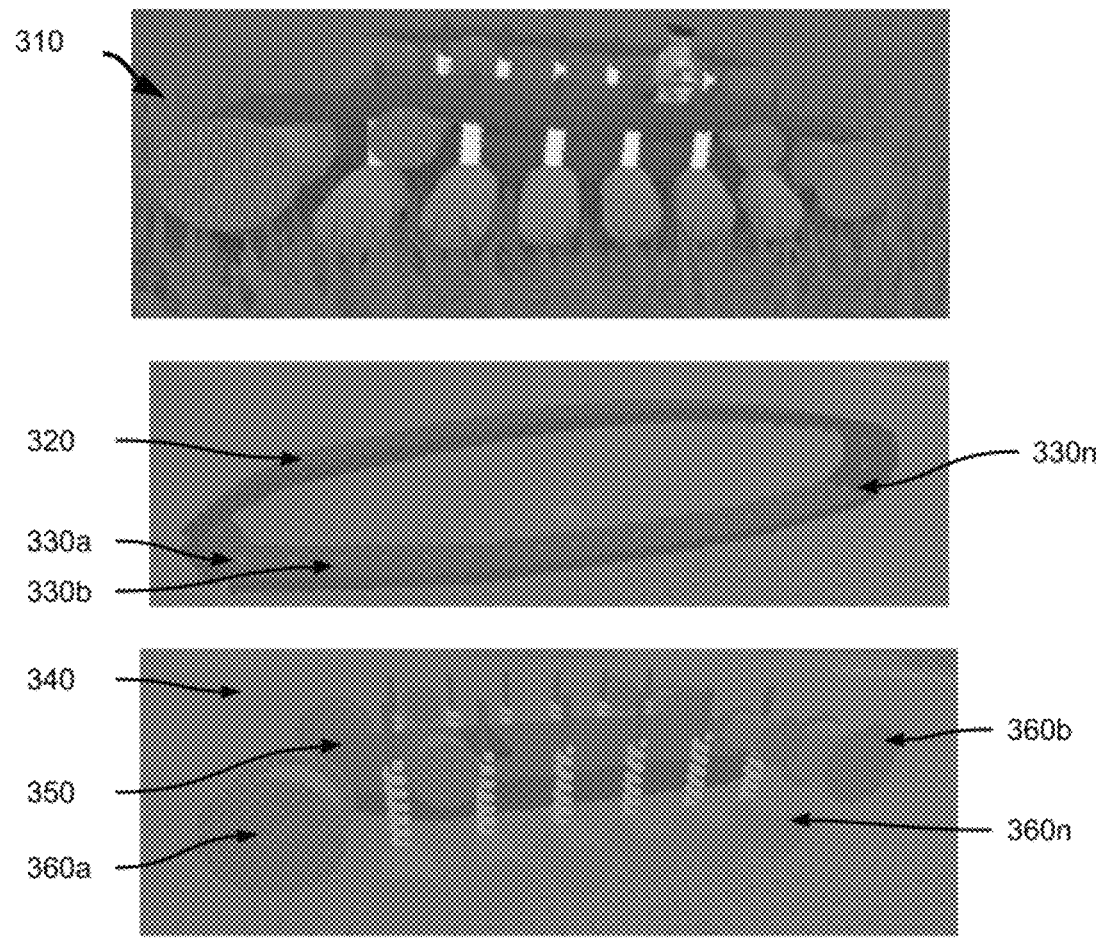
FIG. 3 depicts an example rigid body object mechanism, in accordance with some implementations.

FIG. 3 depicts an example rigid body object mechanism, in accordance with some implementations.

A single rigid body object, or a combination of multiple connected/coupled rigid body object(s) referred to as a mechanism is associated with one or more constraints that act to restrict the movement of the included rigid body object(s). For example, a vehicle can be considered to be a mechanism that includes multiple rigid body objects—a chassis, a body mounted onto the chassis, multiple accessories (e.g., wipers, spoilers, etc.) that are mounted onto the body, and associated with multiple constraints, e.g., wheels that support the chassis, shock reducing springs/struts that cushion vibration of the body, etc.

In this illustrative example FIG. 3 depicts a tracked vehicle 310 that is a mechanism within a virtual environment. As depicted in FIG. 3, the tracked vehicle includes a track 320, that in turn includes multiple segments 320, that are connected to one another by hinges 330*a-n*. For example, track 320 may be similar to that used on a vehicle such as a bulldozer or a tank in the real world. The tracked vehicle additionally includes body 340, that includes a frame 350 and multiple wheels 360*a-n*.

Simulating motion of the tracked vehicle within a virtual environment entails simulation of the tracked vehicle over a variety of terrains, and accurate determination and/or display of the update state of the tracked vehicle needs accurate determination of the state of the tracked vehicle as it traverses the virtual environment.

One or more users may view the motion of the tracked vehicle within a virtual environment on respective user devices, e.g., as part of a game where multiple drivers of the tracked vehicles compete in an obstacle race to determine a winner. Accurate simulation of the tracked body and its movements can enable a superior user viewing and gameplay experience, e.g., by depicting smooth motion without discontinuities such as jitters, explosions, etc., that may be introduced into the updated state by instabilities in the physics solver, etc.

Figure 4:
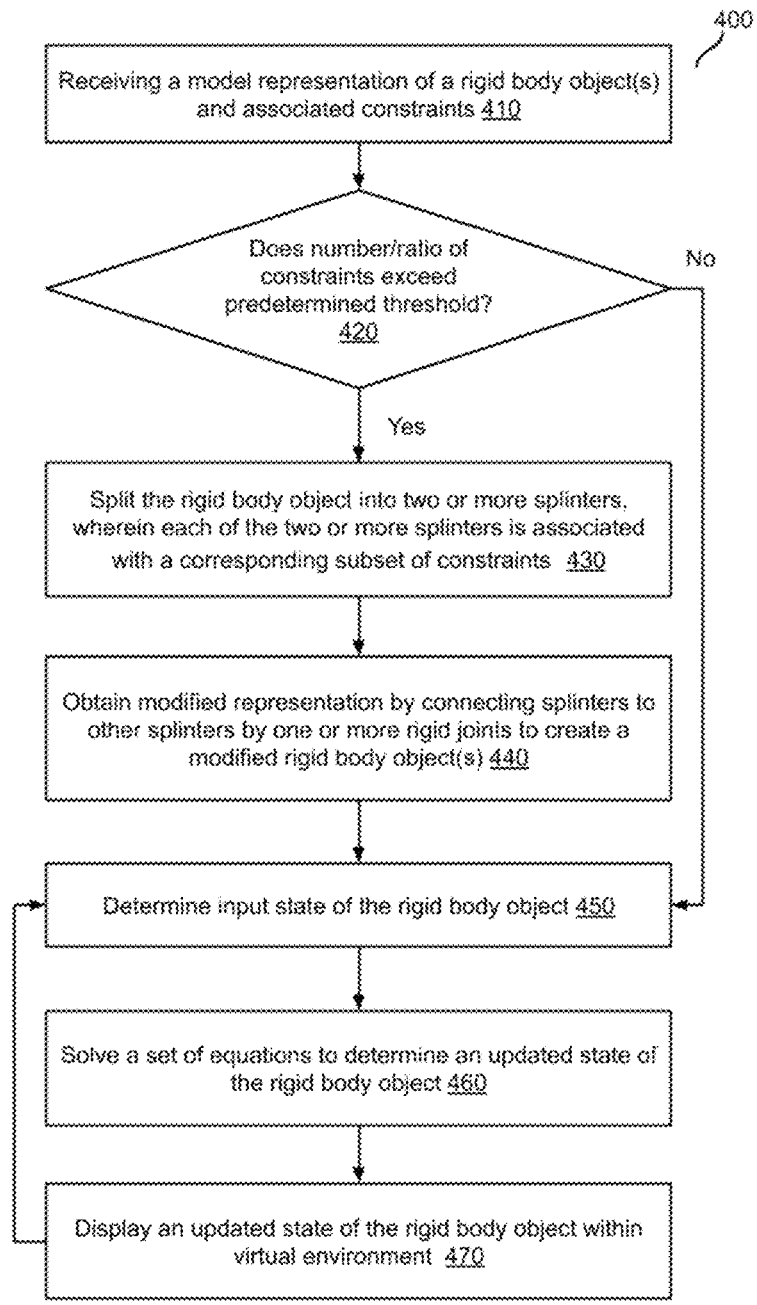
FIG. 4 is a flowchart illustrating an example method to simulate and/or display a rigid body object within a virtual environment, in accordance with some implementations.

FIG. 4 is a flowchart illustrating an example method 400 to simulate and/or display a rigid body object within a virtual environment, in accordance with some implementations. In some implementations, method 400 can be implemented, for example, on gaming server 102 described with reference to FIG. 1. In some implementations, some or all of the method 400 can be implemented on one or more client devices 110 as shown in FIG. 1, on one or more developer devices 130, or on one or more server device(s) 102, and/or on a combination of developer device(s), server device(s) and client device(s). In described examples, the implementing system includes one or more digital processors or processing circuitry ("processors"), and one or more storage devices (e.g., a data store 120 or other storage).

In some implementations, special processors, e.g., physics processors, vector processors, graphics processors, etc. may be utilized to implement one or more of method 400.

In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device. Method 400 may begin at block 410.

At block 410, a model representation of the rigid body object is received. The model representation includes a plurality of constraints for the rigid body object. In some implementations, the model representation may include a model, e.g. two-dimensional (2D) or three-dimensional (3D) model of a rigid body object that describes the rigid body object and one or more constraint functions that characterizes connectivity, e.g., structural connectivity between the rigid body and one or more constraints of the plurality of constraints.

Figure 5A:
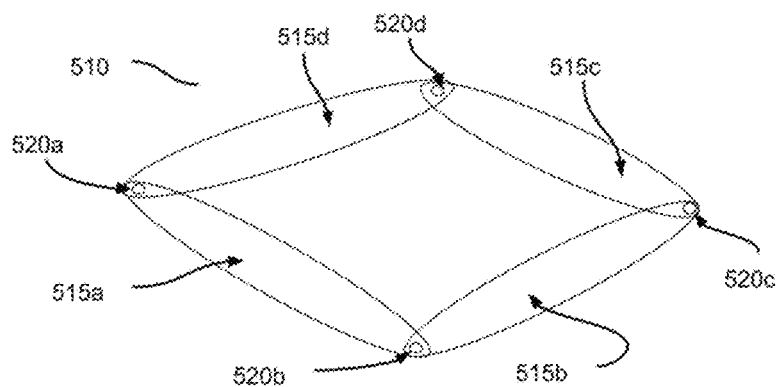
FIG. 5A depicts an example rigid body object-based mechanism, in accordance with some implementations.
Figure 5B:
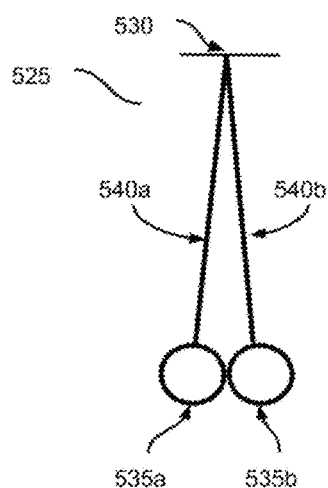
FIG. 5B depicts an example rigid body object based mechanism, in accordance with some implementations.
Figure 5C:
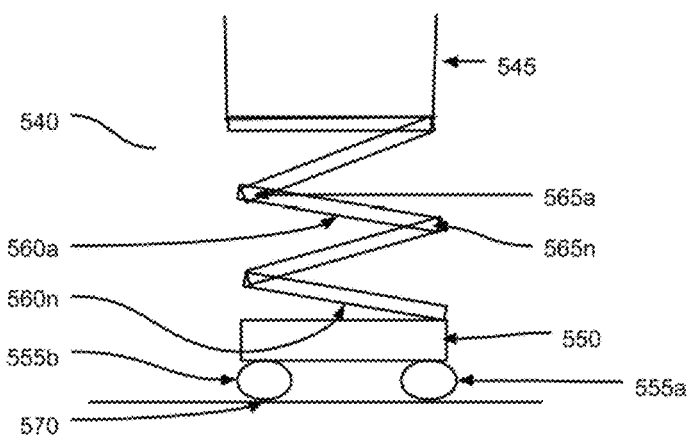
FIG. 5C depicts an example rigid body object-based mechanism, in accordance with some implementations.

FIG. 5A-C depicts example rigid body objects and mechanisms, in accordance with some implementations. A mechanism may be an object, e.g., a virtual object within a virtual environment, that includes one or more other rigid bodies coupled together.

FIG. 5A depicts an example rigid body object based mechanism, in accordance with some implementations.

As depicted in FIG. 5 A, a first example mechanism 510 is a set of four plates 515*a-d*, each of which is connected to two other plates by means of corresponding hinges 520*a-d*. Each of the four plates can be modeled as a rigid body object, while the hinges are constraints associated with corresponding plates since they act restrain the free motion of the plates, e.g., by only enabling a rotational motion of each plate about a hinge rather than allow free unrestrained motion of the plate, as is the case if there was no hinge to restrict motion of a plate. A consequence of a constraint on a rigid body object is to restrict its available degrees of freedom. A constraint dimension for a rigid body is based on a number of constraints on the rigid body and a dimensionality of the rigid body object, e.g., two-dimensional body, three-dimensional rigid body, etc.

FIG. 5B depicts an example rigid body object and based mechanism, in accordance with some implementations.

As depicted in FIG. 5 B, a second example mechanism 525 is a set of two spheres 535*a* and 535*b*, each of which are connected to a common point 530 using corresponding tethers (e.g., ropes, strings) 540*a* and 540*b*. In this illustrative example, each of spheres 535*a* and 535*b* can be modelled as a rigid body object whose motion is constrained by respective tethers 540*a* and 540*b* in that free motion of the spheres is restricted by the tether to an area that is limited and described by a length of the tether.

For accurate simulation of mechanism 525, a physics solver and/or model representation of the mechanism takes into account that if, for example, the spheres were to be moved away from a state of rest and swung into a motion, their motion would be restricted by the tether (constraint), as well as by potential collisions between the two spheres.

FIG. 5C depicts an example rigid body object based mechanism, in accordance with some implementations.

As depicted in FIG. 5 C, a third example mechanism 540 is a scissor lift, which includes a platform 545. The platform is connected to a base 550 by utilizing a series of arms 560*a-n* which are connected to one another using hinges 565*a*-565*n*. Base 550 is mounted on wheels 555*a* and 555*b*. Simulation of the scissor lift motion can be complicated by the presence of numerous structural constraints, e.g., hinges, wheels, etc., in addition to constraints imposed by frictional forces 570 during motion of the scissor lift across a terrain.

Other example constraints can include hinges, joints such as ball-socket joints, ropes, etc., —anything that constraints the motion of the rigid body object relative to forces applied on it. Block 410 may be followed by block 420.

At block 420, it may be determined whether a number of constraints and/or ratio in the model representation exceed a predetermined constraint threshold. In some implementations, a number of constraints and/or a number of constraint dimensions in the model representation of the rigid body object(s) or mechanism(s) is identified.

The identified number of constraints, identified number of constraint dimensions, and/or ratio of constraints to rigid body objects are compared to a predetermined constraint threshold. Based on a determination that the number of constraints, number of constraint dimensions, and/or ratio of constraints to rigid body meets the predetermined threshold, block 420 is followed by 430; else block 420 is followed by block 450.

In some implementations, the threshold may be evaluated per rigid body to determine whether that body in the rigid body system should be shattered/split.

In some implementations, the threshold may be determined based on a number and type of available processors for the solver, type of devices, e.g., mobile device versus gaming device, whether the solver processing may be split across processors, devices, etc.

In some implementations, the predetermined constraint threshold ratio may be about 20, e.g., 20 constraints per rigid body object.

In some implementations, the predetermined constraint threshold ratio may be about 10, between about 10 and about 20, or between about 20 and about 100.

Figure 6:
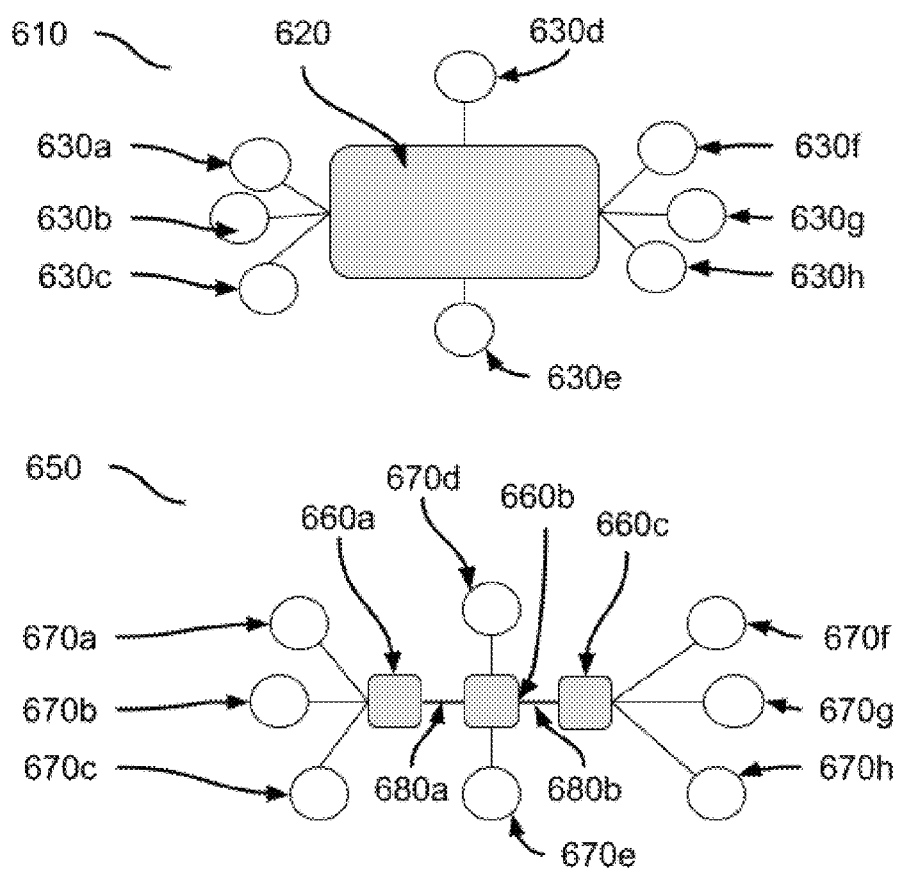
FIG. 6 depicts an example of body splitting (shattering) of a rigid body object, in accordance with some implementations.

At 430, the rigid body object may be split (shattered) into two or more splinters. In some implementations, the rigid body object may be split into two or more splinters based on the model representation, wherein each of the two or more splinters is associated with a corresponding subset of constraints. FIG. 6 depicts an example of body splitting (shattering) of a rigid body object, in accordance with some implementations.

This illustrative example depicts a rigid body object 610 which includes a main body 620 that is connected to multiple wheels (constraints) 630a-630h. For example, the rigid body object may be similar to a toy automaton, e.g., a hexbug, and includes a rigid body and multiple legs/wheels.

In analyzing a model representation of rigid body object 610, it may be determined (similar to a determination described at block 430 described with reference to FIG. 4) that the number of constraints exceeds a predetermined threshold (e.g., for a predetermined threshold number of constraints of 5). In response to the determination, body splitting of the rigid body object is performed to obtain a modified rigid body object 650.

Body splitting is performed by splitting a single rigid body object into smaller objects. In this illustrative example, the rigid body object is split into three smaller splinters (portions of the original main body 620, or shards) 660a, 660b, and 660c. Constraints 630a-h associated with the original rigid body object are distributed amongst the newly created splinters (shards). For example, constraints 670a, 670b, and 670c (which correspond to original constraints 630a-c) are associated with splinter 660a; constraints 670d and 670e (which correspond to original constraints 630d-e) are associated with splinter 660b; and constraints 670f, 670g, and 670h (which correspond to original constraints 630f-h) are associated with splinter 660c.

In some implementations, splitting a (original) rigid body object into two or more splinters is performed such that the constraints are evenly distributed across the splinters. In some implementations, splitting a (original) rigid body object into two or more splinters is performed such that equality constraints in the plurality of constraints are grouped together. Equality constraints are constraints used to specify that the position of a particle or point must match some predefined condition. For example, a ball joint is a type of equality constraint where two rigid bodies connected by a ball joint are always connected at the location of the ball joint. Inequality constraints are constraints used to specify that the position of a particle or point and/or a force to be applied must lie in a predetermined range, rather than be specified exactly. For example, a frictional force or a collision force/impulse at a point of contact between a rigid body object and another object or surface can be specified as an inequality constraint.

Block 430 may be followed by block 440.

At block 440, a modified representation representative of the rigid body object is obtained based on a modified rigid body object that is formed by connecting each of the two or more splinters to one or more other splinters by one or more rigid joints. Block 440 may be followed by block 450.

At block 450, an input state of the rigid body object in the virtual environment is determined. The input state may include one or more parameters that describe a state of the rigid body object and may optionally include the state of other rigid object(s), forces acting on the rigid body object, etc.

In some implementations, the input state may include at least a position and an orientation associated with the rigid body object. The position and orientation may be described in relation to a suitable reference frame and in suitable units. Block 450 may be followed by block 460.

At block 460, a set of equations based on the modified representation of the rigid body object are solved to determine an updated state of the rigid body object. The updated state of the rigid body object includes at least one of an updated position or an updated orientation of the rigid body object based on solving the system of equations that are generated based on the modified representation (or an original model representation, if body splitting was not performed) of the rigid body object. Block 460 may be followed by block 470.

At block 470, the updated state of the rigid body object within the virtual environment is displayed or caused to be displayed, e.g., on a screen of a user device.

In some implementations the steps of determining, solving, and displaying or causing the display of an updated state are performed once per physics update period, with the updated state at each physics update period being the input state at the next physics update period.

Processing may continue to the next physics update period, where an input state of the rigid body object for the next physics update period is determined at block 450.

In some implementations, a display frame, e.g., a display frame based on which a display screen may be updated may include one or more physics update periods, wherein a physics solver determines an updated state for a rigid body one or more times between display frame updates.

Blocks 410-470 can be performed (or repeated) in a different order than described above and/or one or more steps can be omitted. For example, in some implementations, a comparison at 420 may not be performed, and body splitting may be performed for all received model representations. In other implementations, based on an evaluation of the model representation, partial body splitting (shattering) may be performed, where some portions of a mechanism undergo body splitting whereas others are processed on the basis of an originally received model representation.

Figure 7:
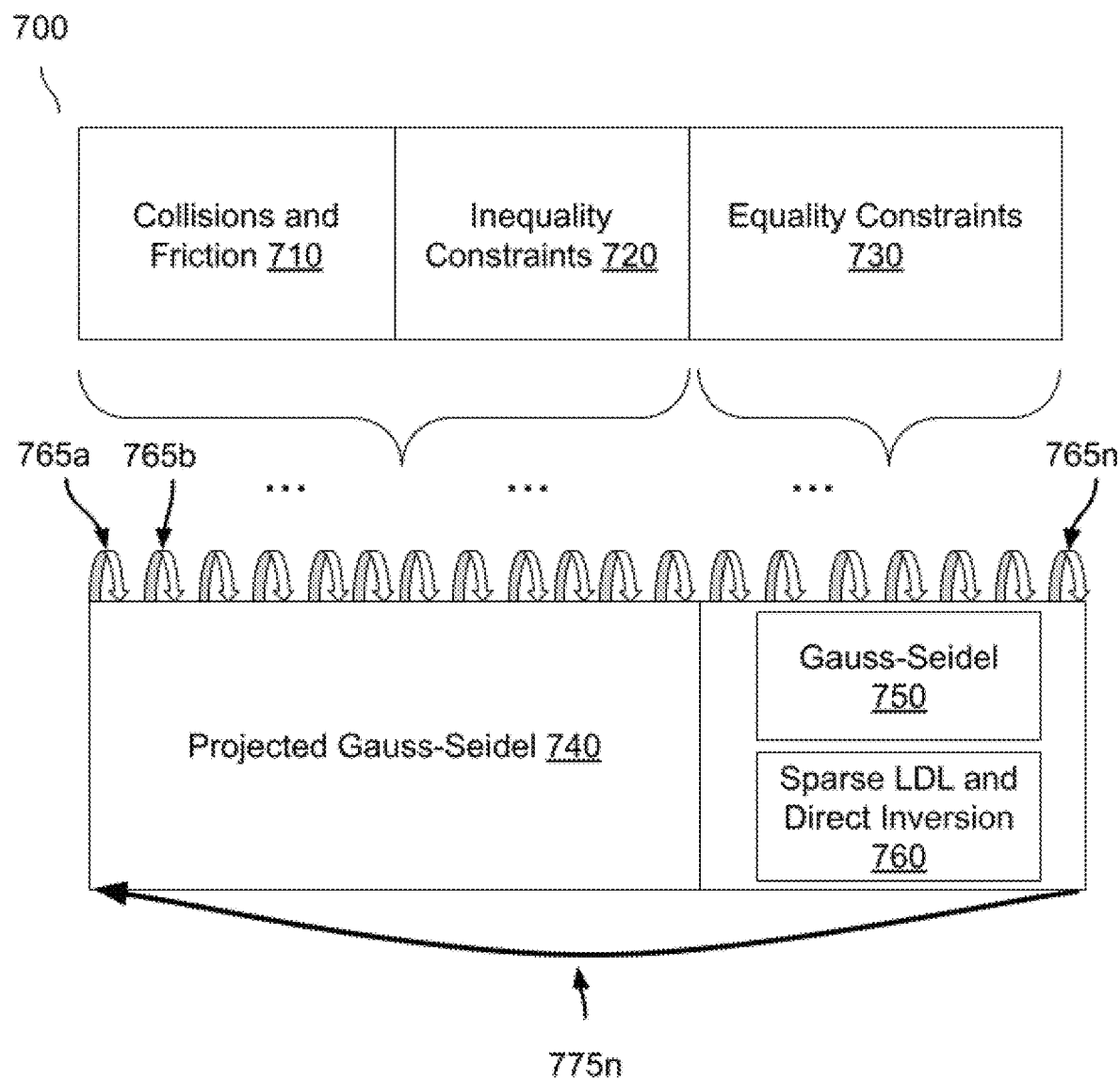
FIG. 7 is a block diagram that depicts an example solver, in accordance with some implementations.

FIG. 7 is a block diagram that depicts an example solver, in accordance with some implementations. In some implementations, some or all of the solver 700 can be implemented on one or more client devices 110 as shown in FIG. 1, on one or more developer devices 130, or on one or more server device(s) 102, and/or on a combination of developer device(s), server device(s) and client device(s). In described examples, the implementing system includes one or more digital processors or processing circuitry ("processors"), and one or more storage devices (e.g., a data store 120 or other storage).

In some implementations, a special processor, e.g. physics processor, vector processor, graphics processor, etc. may be utilized to implement one or more of method 700.

The example solver 700 is utilized to solve a linear system of equations that may be posed as a linear complementarity problem (LCP). In some implementations, a set of equations based on the modified representation are solved iteratively by solving the set of equations associated with the modified rigid body object using a LDL-PGS solver. In some implementations, the LDL-PGS solver includes performing a Gaussian decomposition to a determine a LDL decomposition using the modified representation of the set of equations.

An exact solution to the system of equations depends on the particular set of equations, and in turn depends on parameters such as a number of rigid body objects, type(s) of rigid body objects, dimensions of constraints operating on the rigid body objects, a number of collisions, etc. In many cases, an exact solution may not be feasible within the time constraints of a game, e.g., wherein an updated state of one or more rigid body objects is to be obtained at a frequency that is faster than a frame refresh rate of a display where the updated state is to be displayed.

In some implementations, the solver may utilize an iterative method with good convergence properties such as a Projected Gauss-Seidel (PGS) solver. A PGS solver may utilize multiple iterations that generate approximate solutions to the system of equations at each step such that with each iteration, the approximate solution is brought closer to a true solution. An accuracy of the solution may depend on a number of iterations, which may be configured based on desired accuracy, available processing power, etc.

At each iterative step, one of the constraints is fixed and the other(s) allowed to be violated. After a few iterations, all of the constraints converge to their specified state, and an updated state of the rigid body objects is representative of their true state, within error bounds.

However, iterative solvers can lead to inaccuracies from errors that arise due to time-stepping and iterative solving. Some of the errors are mitigated by utilizing strategies such as warm starting, wherein a solution from a previous time-step is utilized as a starting point for the solver to increase the convergence rate of the iterative solver; post-stabilization, wherein the system is equations is projected onto a constraint manifold to prevent constraint drift; and by regularization, wherein compliance is added to the constraints to ensure an exact and unique.

In some implementations, an original factorization method is utilized to solve for large sparse constraint matrices and combined with a PGS solver. The resulting implementation is only slightly slower compared to a PGS solver, but with the added benefit that the linear system representative of the equality constraints is solved exactly. Consequently, errors in the equality constraints arise only due to time discretization. In some implementations, direct methods may also be applied to inequality constraints and collisions.

In some implementations, a hybrid LDL-PGS solver 700 is utilized, which uses an exact solution (as opposed to an iterative and numerical solution) to a portion, e.g., a linear subsystem, of the system of equations, thereby improving the stability of solutions when applied to complex mechanisms.

As described earlier with reference to FIG. 2, a solver takes as input the previous (or input) state of the rigid body object(s) and solves for a system of equations based on external forces, constraints, etc. For example, a solver accounts for collisions and frictional forces 710, inequality constraints 720, and equality constraints 730.

In some implementations, the iterative method utilized a Projected Gauss-Seidel 740 to iteratively solve for collisions/friction and the inequality constraints. As described earlier, an output at each iteration 765a is utilized as a starting point for the next iteration 765b.

However, for the equality constraints, a Gauss-Seidel 750 and/or Direct inversion method 760 is utilized. In some implementations, every iteration of the solver utilizes a direct inversion method to obtain a direct solution to a constraint matrix associated with the equality constraints.

However, where this may prove infeasible due to computational constraints, multiple iterations of a Gauss-Seidel method are utilized to obtain a solution to the constraint matrix, and a direct inversion (Block Gauss-Seidel method) is utilized for the last iteration or a penultimate iteration of the solver. This enables the solver to still provide good convergence properties and stability, with lower computational requirements. This also enables parallelization of the solver, whereby a LDL decomposition of a constraint matrix can be performed while the Gauss-Seidel iterations are performed, and the obtained LDL decomposition is utilized in the ultimate or penultimate iteration to obtain a direct solution to the constraint matrix via direct inversion using sparse LDL decomposition. The LDL decomposition is performed using Gaussian elimination on an original constraint matrix that is reduced to a block structure that facilitates efficient computation of a direct matrix inverse of a constraint matrix.

In some implementations, a plurality of iterations of a Projected Gauss-Seidel (PGS) solver is performed to determine constraint impulses associated with a modified rigid body object, and an LDL decomposition may be performed of a constraint matrix associated with the modified rigid body object. A Block Gauss-Seidel operation may be performed to apply LDL corrections to the constraint impulses computed by the PGS solver to determine an updated state of the modified rigid body object.

In some implementations, graph-theoretic techniques may be utilized for the simplifying of computer operations associated with the solver, e.g., to obtain a solution to a system of equations associated with a rigid body object.

Figure 8:
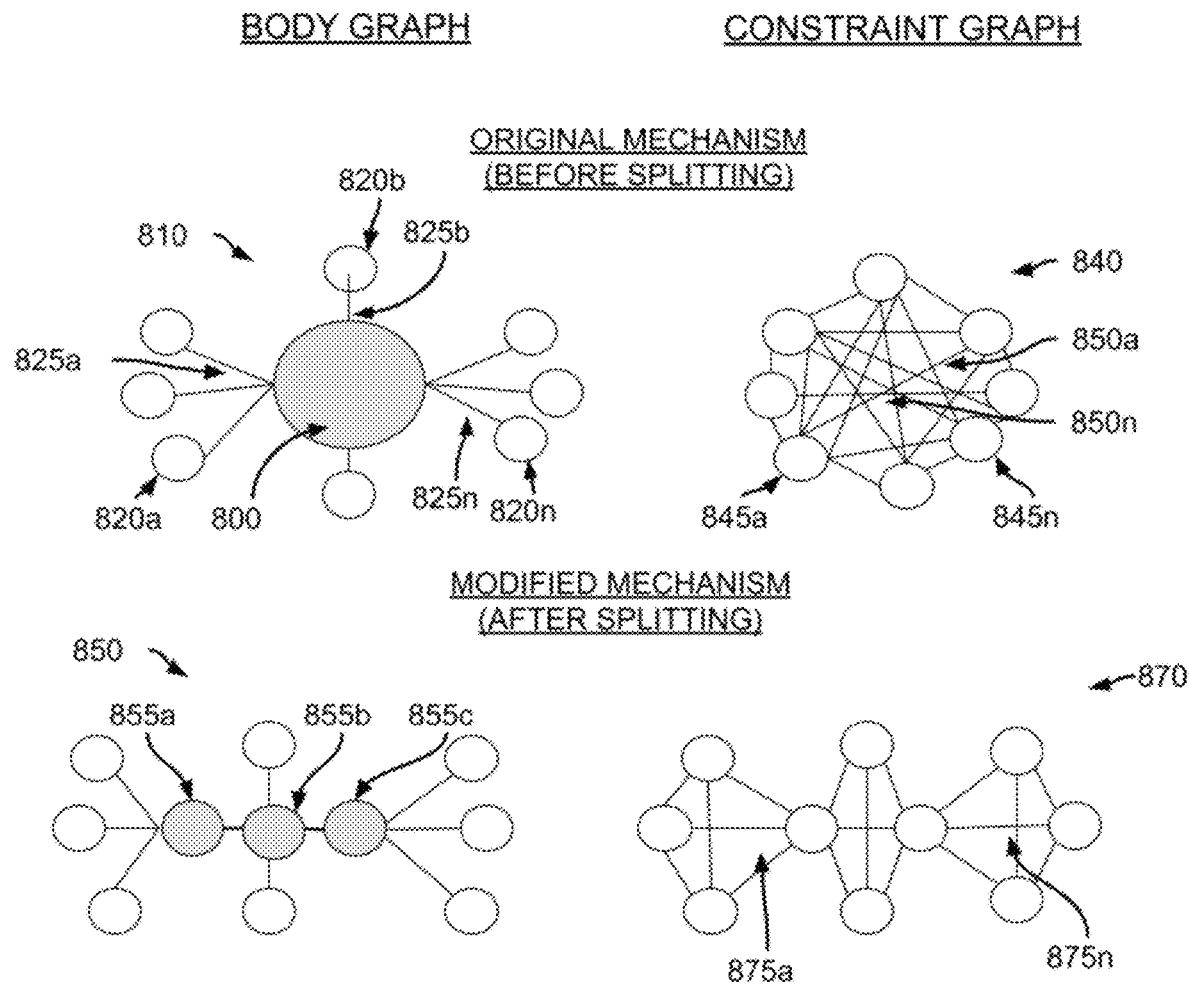
FIG. 8 depicts an example body graph and a constraint graph for a rigid body and a modified rigid body, in accordance with some implementations.

FIG. 8 depicts an example body graph and a constraint graph for an original rigid body mechanism and a modified rigid body mechanism, in accordance with some implementations.

FIG. 8 depicts a body graph 810 of an original rigid body mechanism that includes a main body 800 and outer bodies 820a-n that are associated with constraints. The mechanism corresponds to rigid body object 620 described with reference to FIG. 6.

A body graph is a graph-theoretic representation wherein nodes of the body graph represent the rigid body objects (rigid bodies) and the edges represent the constraints. In this illustrative example, the body graph includes a node 800 that represents the central rigid body object, nodes 820a-n that represent outer rigid body objects, and edges 825a-n that represent the constraints between corresponding rigid body objects.

FIG. 8 also depicts a corresponding constraint graph 840 (a dual to a body graph and also referred to as an edge graph) where the nodes represent the constraints, and the edges represent common rigid body objects. In this illustrative example, the constraint graph includes nodes 845a-n that represent the constraints, and edges 850a-n that represent rigid body objects common to two nodes. As can be seen, the constraint graph is relatively dense, and indicative of a relatively higher computational complexity to perform a direct matrix inversion via an elimination method, e.g., Gaussian elimination.

However, body splitting (shattering), as described earlier with reference to FIG. 6 is an attractive method to sparsify a dense constraint matrix. FIG. 8 depicts a body graph and a constraint graph of a modified mechanism, wherein body splitting is performed on an original rigid body mechanism.

FIG. 8 depicts a body graph 850 of a modified mechanism. A single rigid body object (and corresponding node) is now split into three rigid bodies (and nodes) 855*a*, 855*b*, and 855*c*, and each is associated with corresponding constraints. A corresponding constraint graph 870 is depicted with edges 875*a-n* representative of common bodies between constraints. As can be seen, the constraint graph is relatively sparse even with the addition of two constraints (the connecting joints).

A sparser constraint graph is indicative of relatively lower computational cost for direct inversion, and may be realized by body splitting, especially, when a rigid body object or mechanism is associated with a large number of constraints.

As described with reference to FIG. 4, when a relatively large number of constraints are encountered, a modified rigid body object or mechanism is created by body splitting, and a body graph of the modified representation of the rigid body is constructed, wherein each node of the body graph represents a particular splinter, and edges of the body graph represent corresponding constraints.

Additionally, a constraint graph is constructed, wherein a node of the constraint graph represents a particular constraint, and edges of the constraint graph represent common splinters between corresponding constraints.

In some implementations, an order of elimination of nodes in a Gaussian elimination operation is determined by applying a minimum edge creation algorithm to the constraint graph to generate an ordered sequence of nodes.

In some implementations, a minimum degree algorithm may be utilized to determine an order of elimination of nodes in the Gaussian elimination operation.

In some implementations, memory allocation is also based on the elimination order such that memory locations are packed suitably to ensure efficient memory access during matrix inversion. In some implementations, the memory allocation may be augmented by Reduction Scattering Indexation (RSI) which enables better use of indices and a lower memory utilization.

In some implementations, elements of the matrix may be stored as an array in one or more storage devices, e.g., random access memory, graphics processing unit (GPU), etc. The elements may be stored in a row-major order or in a column-major order. The order chosen arranges certain elements of the matrix such that they are contiguous in memory. In row-major order, the consecutive elements of a row of the matrix are located in memory next to each other, whereas in column-major order, elements of a column of the matrix are located in memory next to each other. Placing elements in this manner can reduce the computing resources required to access the elements, e.g., by enabling elements to be retrieved with fewer memory accesses or other benefits provided by the spatial locality of related elements.

In some implementations, the matrix elements are stored row per row within each column, and each column is stored one after the other from left to right. This memory layout may be utilized for the reduction step of the Gaussian Elimination algorithm. In some implementations, this is the most expensive step in the matrix inversion.

In some implementations, edge matrices are multiplied by the transpose of the lower triangular matrices, which results in row-row dot products that include multiplication of matrix elements that are located as adjacent elements in a row, and such that the matrix elements are fetched in an order in which they are stored in memory. Such a memory layout is particularly useful for CPU prefetch prediction, since the elements are processed by a processor, e.g., CPU, in the order that they are laid out in memory.

In some implementations, the solver performs the solution using a symbolic phase wherein a mechanism/rigid body object structure is analyzed once per mechanism to generate an optimal LDL decomposition program and a numeric phase which is performed once per update period.

FIG. 9A depicts an example symbolic phase for the simulation of rigid body objects and mechanisms, in accordance with some implementations. The symbolic phase corresponds to blocks 410-440 that are described with reference to FIG. 4 and is performed once per received rigid body object and/or mechanism, and is based upon a received model representation, for example, a model received at block 410.

As part of a symbolic phase 910, a mechanism structure is obtained at block 915. Processing continues to block 920.

At block 920, a body graph is determined based on the obtained mechanism structure. Processing continues to block 925.

At block 925, the mechanism and/or one or more rigid bodies may be split into shards, e.g., based on a determination similar to block 420 described with reference to FIG. 4. A body graph of a modified representation may be determined. Processing continues to block 930.

At block 930, a constraint graph is determined. Processing continues to block 935.

At block 935, an elimination sequence and/or a reduction scattering indexation (RSI) is determined. In some implementations, the outputs of a symbolic phase, e.g., elimination sequence, RSI, body graph, constraint graph etc., may be stored for future utilization on the online gaming platform.

Processing continues to a numeric phase 950, which is performed once per physics update period.

FIG. 9B depicts an example numeric phase for the simulation of rigid body objects and mechanisms, in accordance with some implementations. The numeric phase is performed once per physics update period and/or other determined update frequency, and generally corresponds to operations described in blocks 450-470 of FIG. 4.

In the numeric phase, precomputed elimination sequences, memory indices, etc., from the symbolic phase are utilized to obtain per update period updates for the state of a rigid body object or mechanism.

At block 955, a state of the rigid body object or mechanism is obtained. Processing continues to block 960.

At block 960, a Jacobian matrix and a mass matrix are obtained to determine one or more forces acting on the rigid body object. Processing continues to block 965 and/or block 970, which may be performed sequentially or in parallel.

At block 965, iterations of a Projected Gauss-Seidel (PGS) solver are performed to solve for collisions, frictions, and other inequality constraints. In some implementations, iterations may also be performed using a Gauss-Seidel solver to solve for equality constraints. Processing continues to block 980 (or in a sequential process, to block 970).

At block 970, a constraint matrix is determined for the equality constraints. Processing continues to block 975, where an LDL decomposition is performed. Processing continues to block 980.

At block 980, a single interaction of a Block Gauss-Seidel (direct inversion based solution) is performed to obtain a direct solution. In some implementations, the iterations and LDL decomposition can be performed in parallel. For example, in some implementations, blocks 970 and 975 may be performed in parallel with performance of iterations in block 965. Such parallelization may enable the computationally intensive operation of LDL decomposition to be performed in parallel to the multiple iterations of the PGS and/or GS operations.

Processing continues to block 985.

At block 985, constraint impulses are applied to obtain an updated state of the rigid body object or mechanism for a particular physics update period.

In some implementations, the updated state of the modified rigid body object may include one or more of an updated position, an updated orientation, an updated linear velocity, an updated acceleration, and an updated angular velocity associated with the rigid body object.

Figure 10:
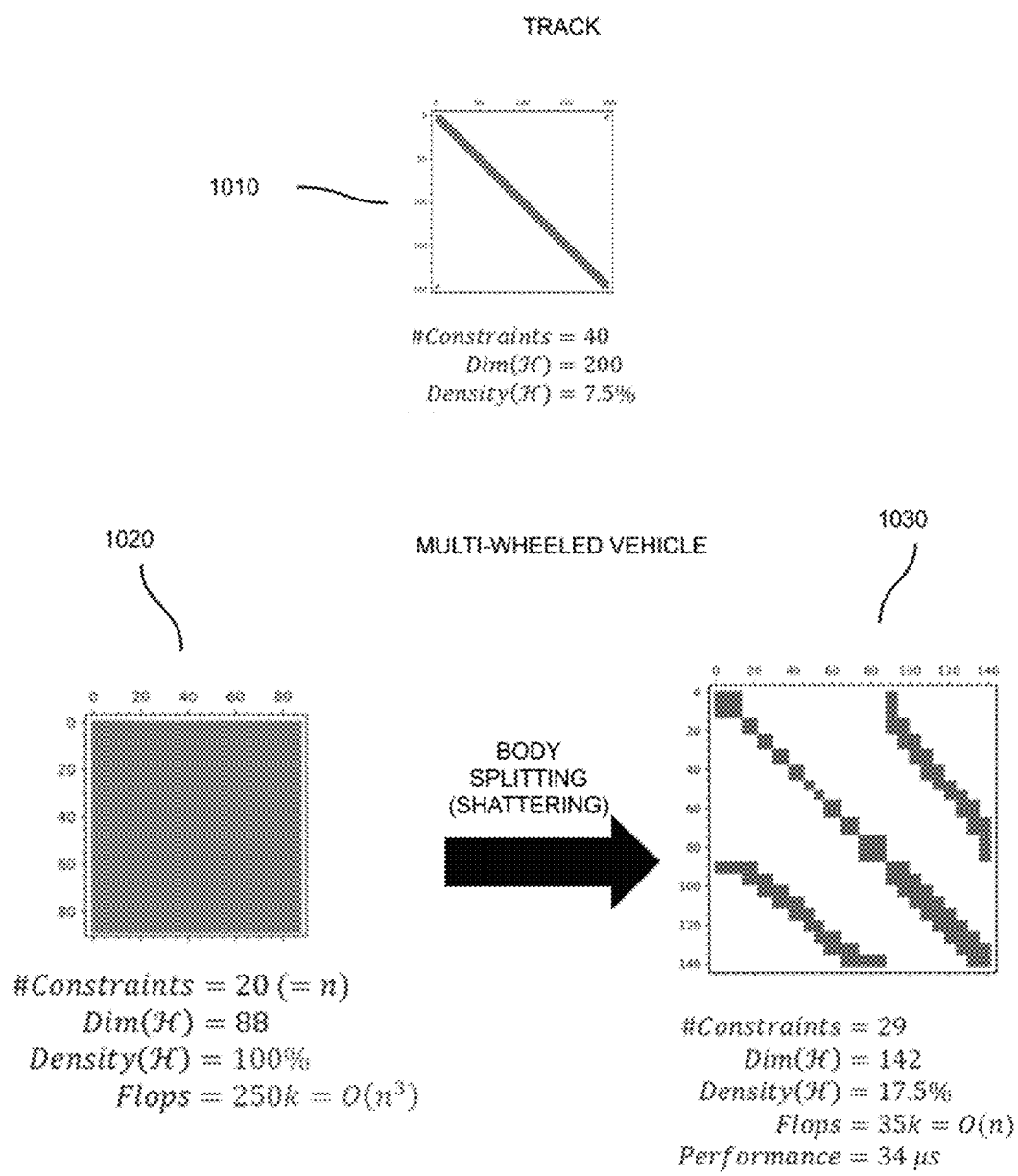
FIG. 10 depicts example computational gains realized by performing body splitting, in accordance with some implementations.

FIG. 10 depicts example computational gains realized by performing body splitting, in accordance with some implementations.

In this illustrative example, example gains are depicted for the tracked vehicle mechanism described with reference to FIG. 3.

As depicted in FIG. 10, the constraint matrix for the track portion (320 described with reference to FIG. 3) of the tracked vehicle is relatively sparse in its original model representation. A number of constraints is 40 (each plate of the track). A ratio of constraints to dimension (of nodes/rigid bodies) is determined to be 0.2. The density of a Holonomic matrix associated with the equality constraint is determined to be 7.5%. Body splitting (shattering) is not performed for this mechanism.

The multi-wheeled vehicle, on the other hand, has 20 constraints (wheels). However, the density of a Holonomic matrix associated with the equality constraint is determined to be 100%, and the solver requires 250K flops for direct inversion.

It is determined that the multi-wheeled vehicle meets the constraint threshold and body splitting is performed to split the main body of the multi-wheeled vehicle into multiple rigid bodies that are connected by rigid joints. Constraints are suitably distributed between the newly created shards.

As depicted in FIG. 10, based on the modified representation (after body splitting), even with a higher number of constraints, a density of the Holonomic matrix associated with the equality constraints is reduced to 17.5%, and leads to a sparser constraint matrix and a solver can perform the direct inversion in 35 k flops.

The lower computational cost can lead to a solver completing its determination of an updated state of a mechanism in a shorter time period, and can enable smoother animation. The higher stability of the solver, e.g., due to direct inversion of a constraint matrix associated with equality constraints enables better stability of updated states, and a better viewing experience for users.

Figure 11:
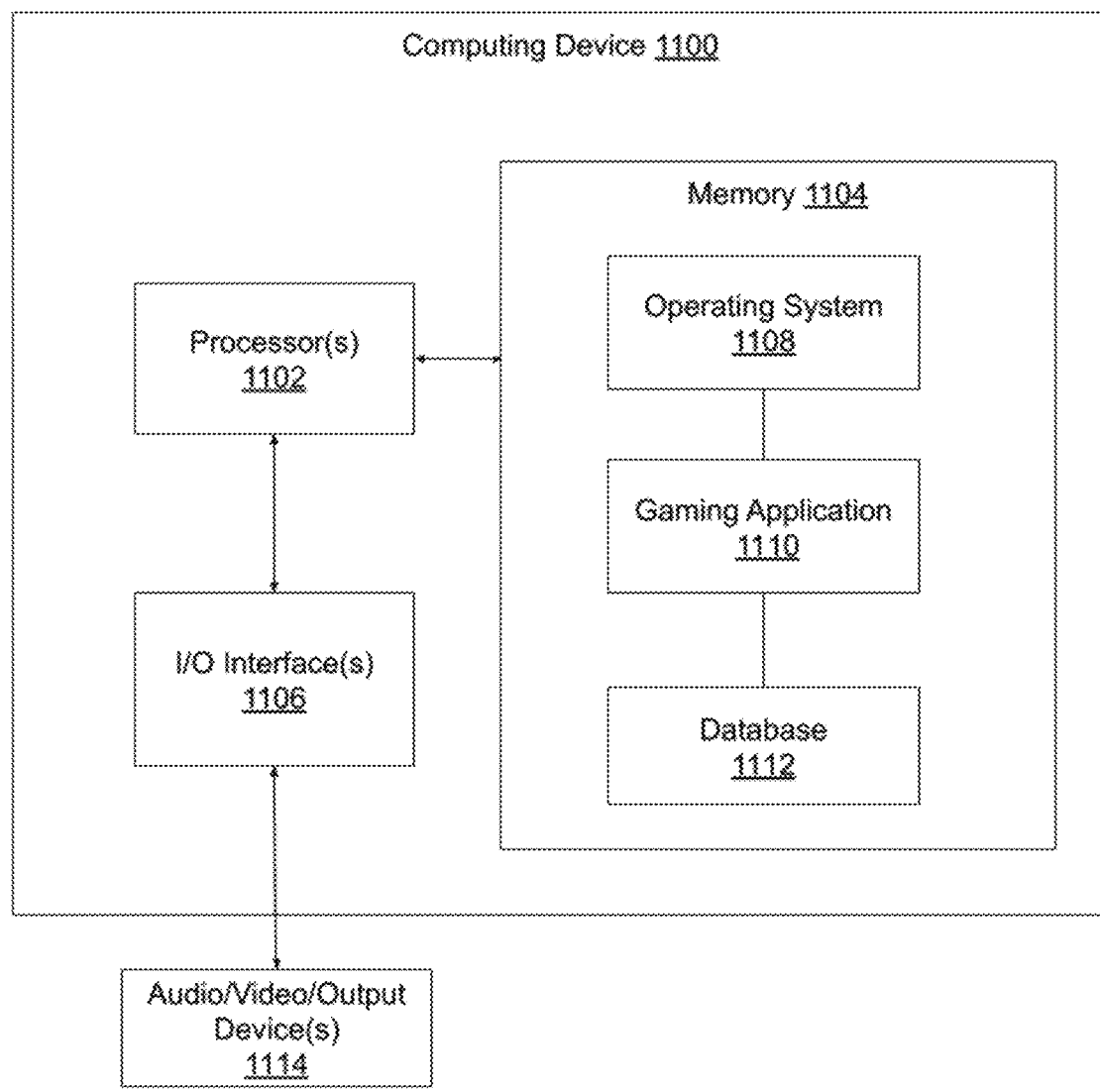
FIG. 11 is a block diagram illustrating an example computing device, in accordance with some implementations.

FIG. 11 is a block diagram of an example computing device 1100 which may be used to implement one or more features described herein. In one example, device 1100 may be used to implement a computer device (e.g. 102 and/or 110 of FIG. 1), and perform appropriate method implementations described herein. Computing device 1100 can be any suitable computer system, server, or other electronic or hardware device. For example, the computing device 1100 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1100 includes a processor 1102, a memory 1104, input/output (I/O) interface 1106, and audio/video input/output devices 1114.

Processor 1102 can be one or more processors and/or processing circuits to execute program code and control basic operations of the device 1100. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1104 is typically provided in device 1100 for access by the processor 1102, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1102 and/or integrated therewith. Memory 1104 can store software operating on the server device 1100 by the processor 1102, including an operating system 1108, one or more applications 1110, e.g., an audio spatialization application and application data 1112. In some implementations, application 1110 can include instructions that enable processor 1102 to perform the functions (or control the functions of) described herein, e.g., some or all of the methods described with respect to FIGS. 4 and 9.

For example, applications 1110 can include an audio spatialization module 1112, which as described herein can provide audio spatialization within an online gaming server (e.g., 102). Elements of software in memory 1104 can alternatively be stored on any other suitable storage location or computer-readable medium. In addition, memory 1104 (and/or other connected storage device(s)) can store instructions and data used in the features described herein. Memory 1104 and any other type of storage (magnetic disk, optical disk, magnetic tape, or other tangible media) can be considered "storage" or "storage devices."

I/O interface 1106 can provide functions to enable interfacing the server device 1100 with other systems and devices. For example, network communication devices, storage devices (e.g., memory and/or data store 120), and input/output devices can communicate via interface 1106. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 1114 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 11 shows one block for each of processor 1102, memory 1104, I/O interface 1106, and software blocks of operating system 1108 and gaming application 1110. These blocks may represent one or more processors or processing circuitries, operating systems, memories, I/O interfaces, applications, and/or software engines. In other implementations, device 1100 may not have all of the components shown and/or may have other elements including other types of elements instead of, or in addition to, those shown herein. While the online gaming server 102 is described as performing operations as described in some implementations herein, any suitable component or combination of components of online gaming server 102 or similar system, or any suitable processor or processors associated with such a system, may perform the operations described.

A user device can also implement and/or be used with features described herein. Example user devices can be computer devices including some similar components as the device 1100, e.g., processor(s) 1102, memory 1104, and I/O interface 1106. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 1114, for example, can be connected to (or included in) the device 1100 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 600) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method to display a rigid body object within a virtual environment, the method comprising:
    receiving a model representation of the rigid body object, wherein the model representation includes a plurality of constraints for the rigid body object;
    splitting the rigid body object into two or more splinters based on the model representation, wherein each of the two or more splinters is associated with a corresponding subset of constraints;
    obtaining a modified representation of the rigid body object based on a modified rigid body object formed by connecting each of the two or more splinters to one or more other splinters by one or more rigid joints;
    determining an input state of the rigid body object in the virtual environment, wherein the input state comprises one or more of a position or an orientation associated with the rigid body object;
    solving a set of equations based on the input state and the modified representation of the rigid body object to determine an updated state of the rigid body object, wherein the updated state includes at least one of: an updated position or an updated orientation of the rigid body object, and wherein solving the set of equations comprises iteratively solving the set of equations associated with the modified rigid body object using a LDL-PGS solver; and
    causing the rigid body object in the updated state to be displayed within the virtual environment.

2. The method of claim 1, wherein the determining, solving, and causing to be displayed are performed once per update period, with the updated state at each update period being the input state at a next update period.

3. The computer-implemented method of claim 1, wherein solving the set of equations based on the modified representation further comprises solving a first portion of the set of equations that includes equality constraints using a Block Gauss-Seidel method and solving a second portion of the set of equations that includes inequality or friction constraints using a Projected Gauss-Seidel method.

4. The computer-implemented method of claim 1, wherein receiving the model representation comprises receiving a model of the rigid body object that describes the rigid body object and one or more constraint functions that characterize connectivity between the rigid body object and one or more constraints of the plurality of constraints.

5. The computer-implemented method of claim 1, further comprising constructing a body graph of the modified representation of the rigid body object, wherein each node of the body graph represents a particular splinter, and each edge of the body graph represents corresponding constraints of the plurality of constraints.

6. The computer-implemented method of claim 5, further comprising constructing a constraint graph, wherein each node of the constraint graph represents a particular constraint, and each edge of the constraint graph represents splinters common between corresponding constraints.

7. The computer-implemented method of claim 1, wherein iteratively solving the set of equations comprises:
determining one or more forces acting on the modified rigid body object;
performing a plurality of iterations of a Projected Gauss-Seidel (PGS) solver;
performing an LDL decomposition of a constraint matrix associated with the modified rigid body object; and
performing a Block Gauss-Seidel operation to apply LDL corrections to constraint impulses computed by the PGS solver to determine the updated state of the modified rigid body object.

8. The computer-implemented method of claim 7, wherein performing the LDL decomposition of the constraint matrix utilizes Gaussian elimination, and wherein an order of elimination of nodes in the Gaussian elimination is determined by applying a minimum edge creation algorithm to a constraint graph associated with the constraint matrix to generate an ordered sequence of nodes.

9. The computer-implemented method of claim 8, further comprising performing memory allocation based on the order of elimination of nodes.

10. The computer-implemented method of claim 1, wherein determining an updated state of the rigid body object comprises determining two or more of an updated position, an updated orientation, an updated linear velocity, or an updated angular velocity associated with the rigid body object.

11. A computer-implemented method to display a rigid body object within a virtual environment, the method comprising:
receiving a model representation of the rigid body object, wherein the model representation includes a plurality of constraints for the rigid body object;
identifying a number of constraints of the plurality of constraints;
comparing a total number of constraint dimensions on the rigid body object against a predetermined threshold;
responsive to determination that the total number of constraint dimensions meets the predetermined threshold, splitting the rigid body object into two or more splinters based on the model representation, wherein each of the two or more splinters is associated with a corresponding subset of constraints;
obtaining a modified representation of the rigid body object based on a modified rigid body object formed by connecting each of the two or more splinters to one or more other splinters by one or more rigid joints;
determining an input state of the rigid body object in the virtual environment, wherein the input state comprises one or more of a position or an orientation associated with the rigid body object,
solving a set of equations based on the input state and the modified representation of the rigid body object to determine an updated state of the rigid body object, wherein the updated state includes at least one of: an updated position or an updated orientation of the rigid body object and
causing the rigid body object in the updated state to be displayed within the virtual environment.

12. The computer-implemented method of claim 11, wherein the predetermined threshold is about 20.

13. A non-transitory computer-readable medium comprising instructions that, responsive to execution by a processing device, causes the processing device to perform operations comprising:
receiving a model representation of a rigid body object, wherein the model representation
includes a plurality of constraints for the rigid body object;
splitting the rigid body object into two or more splinters based on the model representation, wherein each of the two or more splinters is associated with a corresponding subset of constraints;
obtaining a modified representation of the rigid body object based on a modified rigid body object formed by connecting each of the two or more splinters to one or more other splinters by one or more rigid joints;
determining an input state of the rigid body object in a virtual environment, wherein the input state comprises one or more of a position or an orientation associated with the rigid body object;
solving a set of equations based on the input state and the modified representation of the rigid body object to determine an updated state of the rigid body object, wherein the updated state includes at least one of: an updated position, an updated orientation, an updated linear velocity, and an updated angular velocity of the rigid body object, and wherein solving the set of equations comprises solving a first portion of the set of equations that includes equality constraints using a Block Gauss-Seidel method and solving a second portion of the set of equations that includes inequality or friction constraints using a Projected Gauss-Seidel method; and
causing the rigid body object in the updated state to be displayed within the virtual environment.

14. The non-transitory computer-readable medium of claim 13, wherein determining an updated state of the rigid body object comprises determining two or more of an updated position, an updated orientation, an updated linear velocity, and an updated angular velocity associated with the rigid body object.

15. The non-transitory computer-readable medium of claim 13, wherein receiving the model representation comprises receiving a model of the rigid body object that describes the rigid body object and one or more constraint functions that characterize connectivity between the rigid body object and one or more constraints of the plurality of constraints.

16. A system comprising:
a memory with instructions stored thereon; and
a processing device, coupled to the memory, the processing device configured to access the memory and execute the instructions, wherein the instructions cause the processing device to perform operations including:
receiving a model representation of a rigid body object, wherein the model representation includes a plurality of constraints for the rigid body object;
splitting the rigid body object into two or more splinters based on the model representation, wherein each of the two or more splinters is associated with a corresponding subset of constraints;
obtaining a modified representation of the rigid body object based on a modified rigid body object formed by connecting each of the two or more splinters to one or more other splinters by one or more rigid joints;
determining an input state of the rigid body object in a virtual environment, wherein the input state comprises one or more of a position or an orientation associated with the rigid body object;
solving a set of equations based on the input state and the modified representation of the rigid body object to determine an updated state of the rigid body object, wherein the updated state includes at least one of: an updated position, an updated orientation, an updated linear velocity, and an updated angular velocity of the rigid body object, and wherein solving the set of equations comprises iteratively solving the set of equations associated with the modified rigid body object using a LDL-PGS solver; and
causing the rigid body object in the updated state to be displayed within the virtual environment.

17. The system of claim 16, wherein iteratively solving the set of equations comprises:
determining one or more forces acting on the modified rigid body object;
performing a plurality of iterations of a Projected Gauss-Seidel (PGS) solver;
performing an LDL decomposition of a constraint matrix associated with the modified rigid body object; and
performing a Block Gauss-Seidel operation to apply LDL corrections to constraint impulses computed by the PGS solver to determine the updated state of the modified rigid body object.

18. The system of claim 17, wherein performing the LDL decomposition of a constraint matrix utilizes Gaussian elimination, and wherein an order of elimination of nodes in the Gaussian elimination is determined by applying a minimum edge creation algorithm to a constraint graph associated with the constraint matrix to generate an ordered sequence of nodes.

19. The system of claim 16, wherein the determining, solving, and causing to be displayed are performed once per physics update period, with the updated state at each physics update period being the input state at a next physics update period.

20. The system of claim 16, wherein the operations further comprise constructing a body graph of the modified representation of the rigid body object, wherein each node of the body graph represents a particular splinter, and each edge of the body graph represents corresponding constraints of the plurality of constraints.

* * * * *